(12) United States Patent
Heinzelmann et al.

(10) Patent No.: US 6,846,141 B2
(45) Date of Patent: Jan. 25, 2005

(54) EXPANSION BOLT

(75) Inventors: Werner Heinzelmann, Freudenstadt (DE); Rainer Mallee, Waldachtal (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/257,891

(22) PCT Filed: May 19, 2001

(86) PCT No.: PCT/EP01/05762

§ 371 (c)(1),
(2), (4) Date: Oct. 17, 2002

(87) PCT Pub. No.: WO02/12735

PCT Pub. Date: Feb. 14, 2002

(65) Prior Publication Data

US 2003/0108399 A1 Jun. 12, 2003

(30) Foreign Application Priority Data

Aug. 8, 2000 (DE) ......................... 100 38 615

(51) Int. Cl.⁷ ............................................. F16B 13/06
(52) U.S. Cl. ...................................... 411/57.1; 411/55
(58) Field of Search ........................... 411/57.1–62, 43, 411/54, 55, 69–75, 80, 354

(56) References Cited

U.S. PATENT DOCUMENTS

| | | | |
|---|---|---|---|
| 1,601,796 A | * 10/1926 | Gordon | ........................ 411/61 |
| 2,099,678 A | * 11/1937 | Curtis | ........................... 138/98 |
| 3,178,990 A | 4/1965 | Teeple | |
| 3,726,181 A | * 4/1973 | Dickow et al. | ............... 411/50 |
| 4,002,100 A | 1/1977 | Bucheli | |
| 4,278,006 A | * 7/1981 | Lobello | ....................... 411/47 |
| 4,752,169 A | * 6/1988 | Pratt | ........................... 411/43 |
| 4,867,610 A | * 9/1989 | Diffrient | ..................... 403/199 |
| 4,884,931 A | 12/1989 | Revol | |
| 5,765,979 A | * 6/1998 | Mader et al. | ................. 411/61 |
| 6,547,500 B2 | * 4/2003 | Cosenza et al. | ............... 411/34 |

FOREIGN PATENT DOCUMENTS

| | | |
|---|---|---|
| DE | 25 20 115 | 3/1976 |
| DE | 33 43 016 | 6/1985 |
| DE | 195 38 898 A | 4/1997 |
| DE | 198 15 177 A | 10/1999 |
| FR | 445968 | 11/1912 |
| GB | 1 192 694 | 5/1970 |
| WO | 00 329 46 A | 6/2000 |

* cited by examiner

*Primary Examiner*—William L. Miller
(74) *Attorney, Agent, or Firm*—Michael J. Striker

(57) ABSTRACT

The invention relates to an expansible anchor (10) for anchoring in a cylindrical drilled hole (40). The invention proposes constructing the expansible anchor (10) with a tubular basic anchor part (12), on which a hollow conical expansion portion (22) is formed by means of a forming procedure, on which expansion portion (22) an expansion sleeve (14) bent out of sheet metal is mounted. As a result of axial displacement of the expansion sleeve (14) on the expansion portion (22), the expansible anchor (10) becomes anchored in the drilled hole (40). The expansible anchor (10) exhibits subsequent expansion behaviour in the event of widening of the drilled hole (40), for example as a consequence of crack formation.

2 Claims, 3 Drawing Sheets

EXPANSION BOLT

The invention relates to an expansible anchor.

BACKGROUND OF THE INVENTION

Expansible anchors of that kind are known per se. The known expansible anchors have an anchor bolt provided with a screw thread at the rear end and with an expansion cone at the front end. The anchor bolt together with the expansion cone may be referred to as the basic anchor part. An expansion sleeve, which is usually divided into expansion portions by means of longitudinal slits, is mounted on the anchor bolt. The expansion sleeve is expanded as a result of being pushed up on the expansion cone and, as a result, it anchors the expansible anchor in a drilled hole. In the known expansible anchors, expansion is brought about by screwing on and tightening a nut on the screw thread of the anchor bolt. The nut presses against the expansion sleeve directly or—by way of a sleeve mounted on the anchor bolt, between the nut and the expansion sleeve—indirectly and, as a result, pushes the expansion sleeve up on the expansion cone, expanding the expansion sleeve. In the case of such expansible anchors it is disadvantageous that they are complicated and consequently expensive to manufacture. It is further disadvantageous that expansion is brought about by screwing on and tightening the nut on the screw thread of the anchor bolt, which is time-consuming and should always be carried out using a torque wrench.

So-called hammer-in anchors are also known, which can be expanded by driving an expansion member into an expansion sleeve. An axial hole in the expansion sleeve of such expansible anchors becomes narrower between the expansion portions so that the expansion portions can be expanded by driving in the preferably conical expansion member. Such expansible anchors are economical to manufacture and can be expanded simply and rapidly by hammer blows with the aid of, for example, a punch and anchored in a drilled hole as a result. Such expansible anchors have the disadvantage, however, that they exhibit no subsequent expansion behaviour, slackening in the event of widening of the drilled hole, for example caused by crack formation, and coming loose.

SUMMARY OF THE INVENTION

The invention is based on the problem of so constructing an expansible anchor of the kind mentioned at the beginning that it is economical to manufacture and simple to anchor and exhibits subsequent expansion behaviour.

The problem is solved in accordance with the invention. In the case of the expansible anchor according to the invention, the basic anchor parts has a through-hole in the longitudinal direction, which is covered over, for example, by the end wall of the expansion sleeve at the end which Is to the front in the direction of introduction of the expansible anchor into a drilled hole. The expansion sleeve can be subjected to axial force, for example by means of a punch, through the through-hole in the basic anchor part, and by that means can be pushed up on the expansion portion of the basic anchor part and, as a result, expanded. The through-hole in the basic anchor part of the expansible anchor according to the invention accordingly allows expansion by means of hammering and therefore allows rapid anchoring with little outlay.

A further advantage of the expansible anchor according to the invention is its subsequent expansion behaviour. If tension is applied to the basic anchor part of the expansible anchor according to the invention and a drilled hole in which the expansible anchor is anchored widens, for example as a consequence of crack formation, the tension on the basic anchor part causes a displacement of the basic anchor part in relation to the expansion sleeve which pushes the expansion sleeve further up on the expansion portion of the basic anchor part and, as a result, expands it further. As a result, the expansible anchor remains anchored in the drilled hole with an almost unchanged anchoring force. The expansible anchor according to the invention is intended for anchoring in a cylindrical drilled hole. As a result of its subsequent expansion behaviour, it is suitable for use, in a cylindrical drilled hole, in zones subject to tensile forces. The expansion portion of the expansible anchor according to the invention is preferably conical; it is, however, not limited to that shape but may have another shape that widens out in the direction of introduction.

In a preferred embodiment of the invention, the basic anchor part is in the form of a sleeve, which allows simple, rapid and economical manufacture of the basic anchor part, for example by means of a forming technique. The basic anchor part can be, for example, produced from sheet metal by bending to form a sleeve or shaped from a tube. Other techniques for working solid material are also possible.

The expansion portion has, preferably, the shape of a hollow cone and is formed on the sleeve comprising the basic anchor part. In order to increase stability in the radial direction, the expansion portion is, in an embodiment of the invention, of double-walled construction.

In order to be able to expand the expansion sleeve with little radial force, it has, in an embodiment of the invention, one or more slits extending in the longitudinal direction. The slits do not have to extend in an axially parallel direction; they may, for example, also extend at an angle to a line parallel to the axis.

In a preferred embodiment of the invention, the expansion sleeve has an internal cone. In conjunction with a conical expansion portion of the basic anchor part, this embodiment of the invention results in uniform expansion of the expansion sleeve over its axial length and in the peripheral direction. A high anchoring force is achieved as a result. For the purpose of matching a cylindrical drilled hole, the external surface of the expansion sleeve is, in an embodiment of the invention, cylindrical.

In an embodiment of the invention, there is provided an expansion sleeve peg, which engages in the through-hole in the basic anchor part. On the one hand, the peg serves for subjecting the expansion sleeve to axial force in order to push it up on the expansion portion. Furthermore, the peg guides the expansion sleeve in the basic anchor part and prevents tilting or skewing of the expansion sleeve, especially when the expansion sleeve is short in the axial direction.

In an embodiment of the invention, the expansible anchor has a striking pin, which is located in the through-hole of the basic anchor part, in the region of the expansion portion. The expansion sleeve can be subjected to axial force by way of the striking pin and, as a result, pushed up on the expansion portion and expanded. The striking pin has the advantage that it does not hinder displacement of the expansion sleeve on the expansion portion after expansion and, as a result, does not affect the subsequent expansion behaviour of the expansible anchor according to the invention. Furthermore, the striking pin stabilises the expansion portion of the basic anchor portion against radial stressing so that the expansion region does not yield to pressure applied to the expansion sleeve in an inward radial direction.

BRIEF DESCRIPTION OF THE DRAWINGS

The invention is explained in greater detail hereinafter with reference to exemplary embodiments illustrated in the drawing, in which.

DESCRIPTION OF THE PREFERRED EMBODIMENTS

Figure 1:
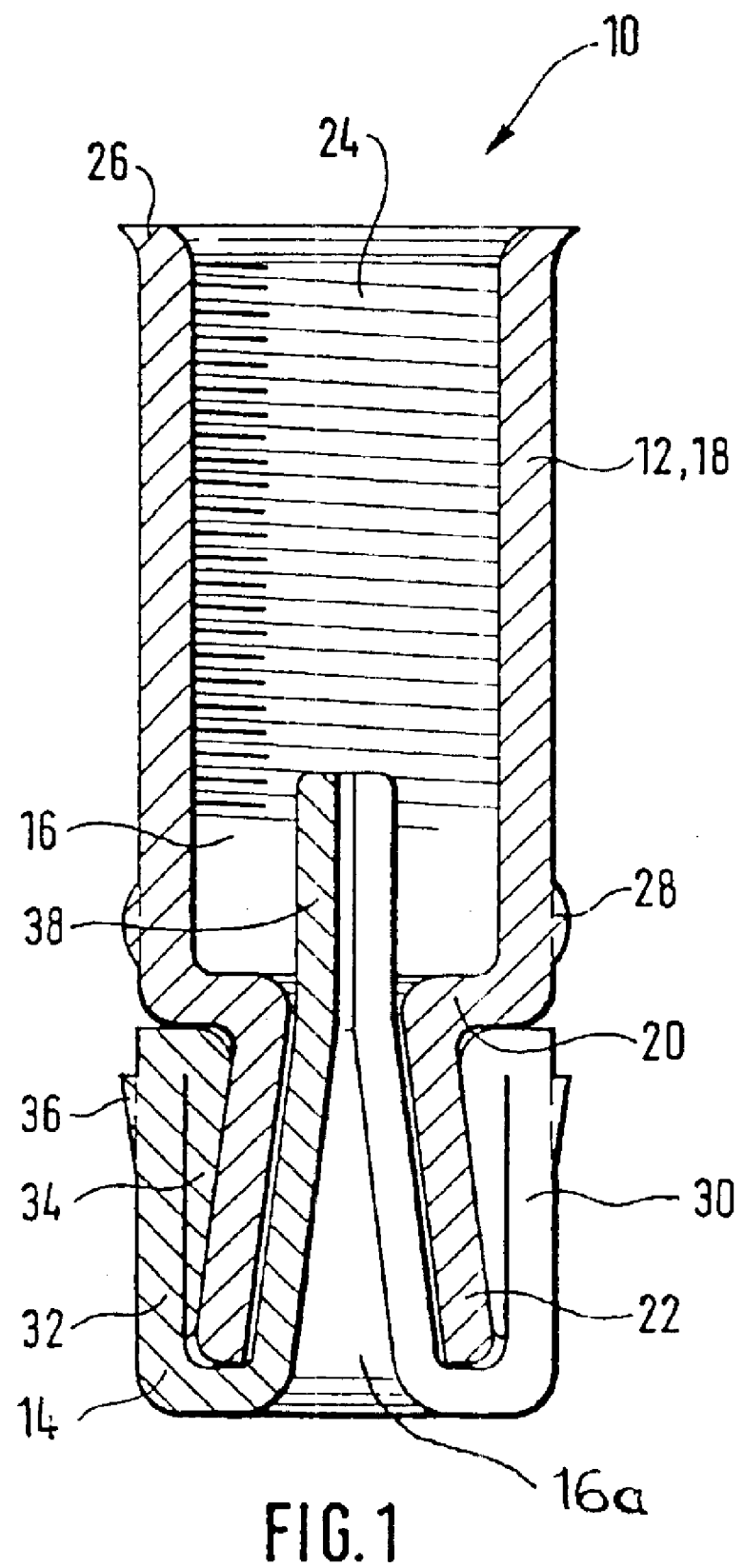
FIG. 1 is an axial section through an expansible anchor according to the invention.

The expansible anchor 10 according to the invention and shown in FIG. 1 has a basic anchor part 12 and an expansion sleeve 14. The basic anchor part 12 is produced from a tube and consequently has a through-hole 16 in the longitudinal direction. The basic anchor part 12 is of hollow cylindrical shape, that is to say has a tubular portion 18, over about ⅔ of its length. Connected to the tubular portion 18, by way of an annular step-shaped narrowing 20, is an expansion portion 22. The expansion portion 22 forms a hollow cone, which widens out away from the tubular portion 18. The direction in which the expansion portion 22 widens out is the direction of introduction of the expansible anchor 10 into a drilled hole; the expansion portion 22 widens out in the direction of the front end of the expansible anchor 10. At its front, widened-out end, the expansion portion 22 has an external diameter which corresponds approximately to the external diameter of the cylindrical portion 18 minus twice the wall thickness of the expansion sleeve 14; the expansion sleeve 14 has approximately the same external diameter as the cylindrical portion 18 of the basic anchor part 12. The through-hole 16 in the basic anchor part 12 also passes through the expansion portion 22.

The annular step-shaped narrowing 20 and the hollow conical expansion portion 22 that widens out in the direction of introduction of the expansible anchor 10 are made by forming the tube comprising the basic anchor part 12. For example, the annular step-shaped narrowing 20 and the expansion portion 22 are formed on the tubular portion 18 by means of flow-forming. The external circumferential surface of the hollow conical expansion portion 22 is provided with a lubricating coating that ensures low-friction axial displaceability of the expansion sleeve 14 on the expansion portion 22 and lastingly prevents "seizing". "Seizing" is understood to mean that the expansion sleeve 14 is difficult to move, or is immovable, axially on the expansion portion 22 of the basic anchor part 12 as a consequence of corrosion phenomena or the like.

The cylindrical portion 18 is provided with an internal thread 24, which is produced, for example, by means of tube thread rolling. The internal thread 24 allows an article being anchored to be fastened to the expansible anchor 10 according to the invention. The rear end edge of the basic anchor part 12, remote from the expansion portion 22, is formed to provide a depth-setting collar 26 as a result of forming in the outwardly radial direction. The wall of the tubular portion 18 is provided with outwardly projecting protrusions 28 in order to achieve jamming of the basic anchor part 12 in a drilled hole.

The expansion sleeve 14 is produced from a sheet metal piece which is bent to form a sleeve, namely the expansion sleeve 14. The expansion sleeve 14 has a continuous longitudinal slit 30, which allows the expansion sleeve 14 to widen out/expand. The expansion sleeve 14 can be provided with further, non-continuous longitudinal slits (not shown) in order to make expansion easier. The expansion sleeve 14 has a hollow cylindrical portion 32, by means of which it surrounds the expansion portion 22 of the basic anchor part 12. The hollow cylindrical portion 32 of the expansion sleeve 14 is of approximately the same length as the expansion portion 22 of the basic anchor part 12. At its end face facing the tubular portion 18 of the basic anchor part 12, the expansion sleeve 14 is formed so that it lies against the inner face of its hollow cylindrical portion 32. The inwardly formed portion 34 has a triangular shape in axial cross-section so that the part of the expansion sleeve 14 surrounding the expansion portion 22 of the basic anchor part 12 has a cylindrical external surface and has a conical inner surface complementary to the hollow cone of the expansion portion 22. The conical inner surface of the expansion sleeve 22 so lies against the expansion portion 22 of the basic anchor part 12 that it is axially displaceable. The external diameters of the tubular portion 18 of the basic anchor part 12 and of the expansion sleeve 14 are approximately the same.

Formed on the hollow cylindrical portion 32 of the expansion sleeve 22 are outwardly projecting barb-shaped claws 36, which are intended to ensure that the expansion sleeve 14 has a good hold in the axial direction in a drilled hole, preventing it from being pulled out.

At the front end face, remote from the tubular portion 18 of the basic anchor part 12, the expansion sleeve 14 is formed in an inwards direction, around the front end edge of the hollow conical expansion portion 22, to provide a peg 38. The peg 38 passes through the expansion portion 22 and protrudes a certain distance into the tubular portion 18 of the basic anchor portion 12 of the expansible anchor 10 according to the invention. The peg 38 guides the expansion sleeve 14 in the expansion portion 22 and prevents skewing of the expansion sleeve 14.

Figure 2:
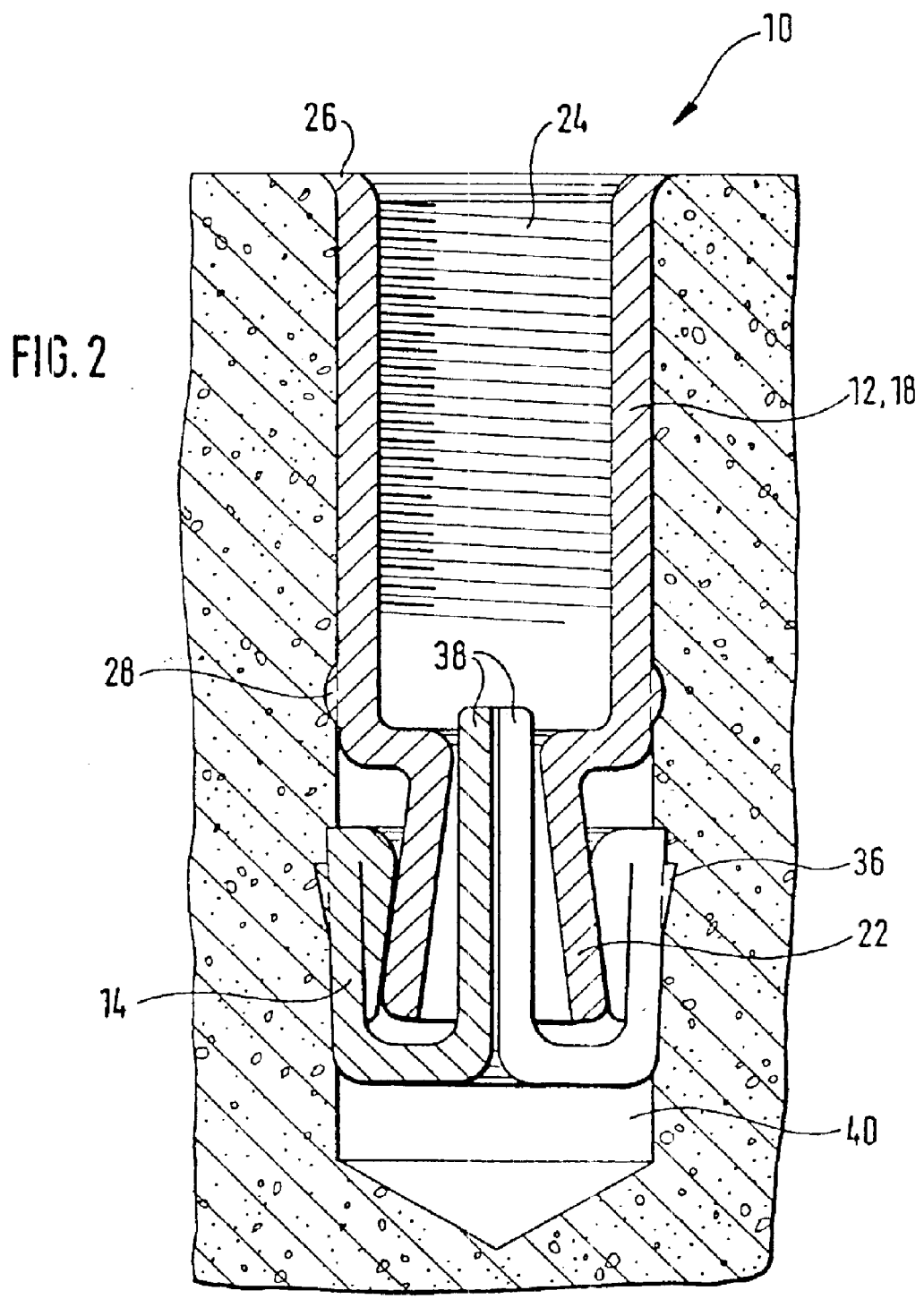
FIG. 2 shows the expansible anchor of FIG. 1 in the anchored state.

Anchoring and use of the expansible anchor 10 according to the invention is illustrated in FIG. 2. For the purpose of anchoring, the expansible anchor 10 is introduced, with its expansion sleeve 14 to the front, into a cylindrical hole 40 drilled, for example, in concrete. The drilled hole 40 must be deeper than the expansible anchor 10 is long; the drilled hole 40 can also be a through-hole. The expansible anchor 10 is introduced into the drilled hole 40 until its depth-setting collar 26 comes into contact with the concrete or until it is flush or slightly recessed in the drilled hole 40. Then a striking tool (not shown), for example a punch, is introduced into the hollow cylindrical portion 18 of the basic anchor part 12, and the expansion sleeve 14 is subjected to axial force, for example by hammer blows, by way of its peg 38. The expansion sleeve 14 is, as a result, axially displaced on the expansion portion 22 of the basic anchor part 12 and is widened out, that is to say expanded. The expansion sleeve 14 jams, or wedges, both itself and the basic anchor part 12 in the drilled hole 40, the expansible anchor 10 according to the invention is anchored in the drilled hole 40. Expansion and anchoring of the expansible anchor 10 in the drilled hole 40 can also be performed by machine. An article can be fastened to the expansible anchor 10 anchored in the concrete, for example by means of a bolt (not shown) screwed into the internal thread 24.

If the drilled hole 40 widens, for example as a result of crack formation in the concrete, axial tension acting on the basic anchor part 12 causes axial displacement of the basic anchor part 12 relative to the expansion sleeve 14, which is fixed in an axially immovable position in the drilled hole 40 by means of its claws 36. The axial displacement of the basic anchor part 12 causes further expansion of the expansion sleeve 14, as a result of which the expansible anchor 10 according to the invention remains anchored in the widened-out drilled hole 40 with an almost unchanged anchoring force. The expansible anchor 10 according to the invention accordingly exhibits so-called subsequent expansion behaviour in the event of widening of a drilled hole.

Figure 3:
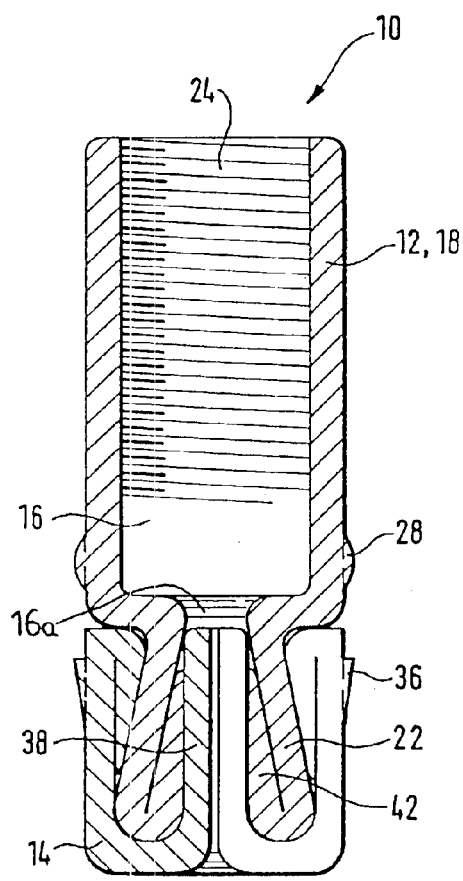
FIG. 3 is an axial section through a second exemplary embodiment of an expansible anchor according to the invention.

In the case of the expansible anchor 10 according to the invention and shown in FIG. 3, the expansion portion 22 of the basic anchor part 12 is, at its free, front end edge, formed in an inwards direction so that it lies against itself, which means that the expansion portion 22 is double-walled. The portion 42 formed in an inwards direction has a triangular shape in axial cross-section; within the expansion portion 22, the through-hole 16 passing through the basic anchor part 12 is cylindrical. As a result of the double-walled construction, the expansion portion 22 of the expansible anchor 10 shown in FIG. 3 has greater stability. The peg 38 of the expansion sleeve 14 is of shortened form so that it does not protrude into the tubular portion 18 of the basic anchor part 12. For the purpose of anchoring, therefore, a striking tool having an extension that fits into the through-hole 16 a should be used. Otherwise, the expansible anchors 10 according to the invention and shown in FIGS. 1 and 3 are of like construction and function in the same manner. To that extent, in order to avoid repetitions, reference should be made, with regard to FIG. 3, to the statements regarding FIGS. 1 and 2. The same reference numerals are used for the same components.

Figure 4:
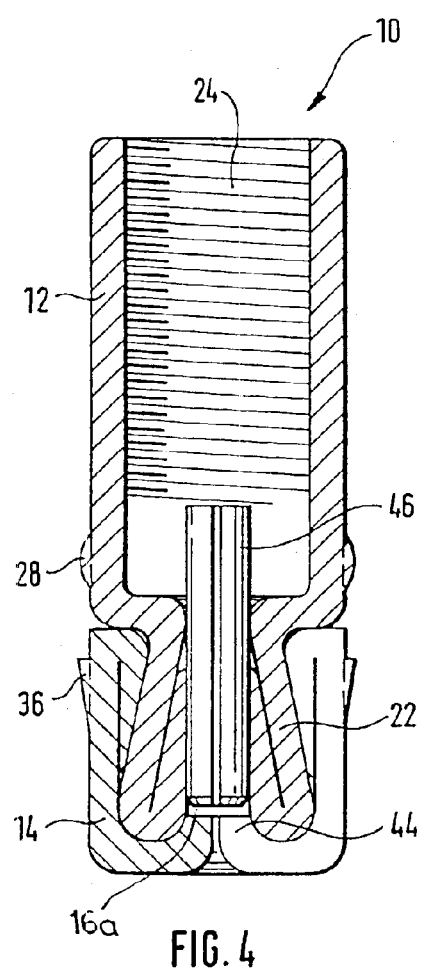
FIG. 4 is an axial section through a third exemplary embodiment of an expansible anchor according to the invention.

In the case of the expansible anchor 10 according to the invention and shown in FIG. 4, the peg of the expansion sleeve 14 is shortened to a short stump, which engages in the front end of the hollow conical expansion portion 22 of the basic anchor part 12. A striking pin 46 is inserted in the expansion portion 22 with a press fit. A cylindrical grooved pin is used as the striking pin 46. In this embodiment of the invention, it is advantageous that, in the event of subsequent expansion of the expansible anchor 10, the striking pin 46 does not take part in the relative movement of the expansion sleeve 14 in relation to the basic anchor part 12 and, accordingly, does not impair the subsequent expansion function. Potential "seizing" of the striking pin 46 in the expansion portion 22 does not hinder subsequent expansion of the expansible anchor 10. Furthermore, the striking pin 46 stabilises the expansion portion 22 against radial compression. Otherwise, the expansible anchors 10 according to the invention shown in FIGS. 3 and 4 are constructed in the same manner and function in the same manner; to that extent, in order to avoid repetitions, reference should be made to the statements regarding FIG. 3.

What is claimed is:

1. Expansible anchor, comprising a basic anchor part which is arranged to be introduced into a drilled hole and has an expansion portion which widens out in the direction of introduction of the expansible anchor, and an expansion sleeve which is so mounted on the expansion portion as to be axially displaceable and is arranged to be expanded as a result of displacement, wherein the basic anchor part (12) has a through-hole (16, 16a) in the longitudinal direction; and the expansion sleeve (14) extends through the through-ole (16a) in the region of the expansion portion (22), wherein the expansion sleeve (14) has a peg (38), which engages in the through-holes (16, 16a) in the basic anchor part (12).

2. Expansible anchor, comprising a basic anchor part which is arranged to be introduced into a drilled hole and has an expansion portion which widens out in the direction of introduction of the expansible anchor, and an expansion sleeve which is so mounted on the expansion portion as to be axially displaceable and is arranged to be expanded as a result of displacement, wherein the basic anchor part (12) has a through-hole (16, 16a) in, the longitudinal direction; and the expansion sleeve (14) extends through the through-ole (16a) in the region of the expansion portion (22), wherein the expansible anchor (10) has a striking pin (46), which is located in the expansion portion (22) of the basic anchor part (12) and by way of Which the expansion sleeve (14) can be subjected to axial force.

* * * * *